United States Patent
Scott et al.

(10) Patent No.: US 7,797,843 B1
(45) Date of Patent: Sep. 21, 2010

(54) OPTICAL SIGHT

(75) Inventors: Valerie Anne Scott, Cambridge (GB); Alan Edward Green, Cambridge (GB); Euan Morrison, Cambridge (GB)

(73) Assignee: GS Development AB, Malmo (SE)

( * ) Notice: Subject to any disclaimer, the term of this patent is extended or adjusted under 35 U.S.C. 154(b) by 0 days.

(21) Appl. No.: 09/520,087

(22) Filed: Mar. 7, 2000

(30) Foreign Application Priority Data

Jul. 15, 1999 (GB) .................... 9916676.1

(51) Int. Cl.
*F41G 1/34* (2006.01)
(52) U.S. Cl. .................. 33/227; 33/DIG. 21
(58) Field of Classification Search .......... 33/227, 33/286, 297, 298, 263, DIG. 21; 42/131, 42/132, 100, 101, 103
See application file for complete search history.

(56) References Cited

U.S. PATENT DOCUMENTS

| | | | | |
|---|---|---|---|---|
| 3,942,901 A * | 3/1976 | Ekstrand | ...................... | 356/251 |
| 3,963,356 A * | 6/1976 | Wiklund | ...................... | 356/251 |
| 4,313,273 A * | 2/1982 | Matthews et al. | ............. | 42/117 |
| 4,606,724 A * | 8/1986 | Chanforan et al. | ............ | 434/16 |
| 4,665,622 A * | 5/1987 | Idan | ............................ | 33/241 |
| 4,879,814 A * | 11/1989 | Wallace et al. | ......... | 33/DIG. 21 |
| 5,001,836 A * | 3/1991 | Cameron et al. | ............. | 42/116 |
| 5,179,235 A * | 1/1993 | Toole | ........................ | 362/110 |
| 5,189,555 A * | 2/1993 | Jorlov | ......................... | 42/113 |
| 5,351,429 A * | 10/1994 | Ford | ............................. | 42/103 |
| 5,440,387 A * | 8/1995 | Montelin et al. | ............. | 42/113 |
| 5,483,362 A * | 1/1996 | Tai et al. | ........................ | 359/1 |
| 5,531,040 A | 7/1996 | Moore | | |
| 5,577,326 A | 11/1996 | Montelin | | |
| 5,594,584 A * | 1/1997 | Kay et al. | ..................... | 42/113 |
| 5,901,452 A * | 5/1999 | Clarkson | ..................... | 33/241 |
| 5,924,234 A * | 7/1999 | Bindon et al. | ................. | 42/101 |
| 5,933,224 A * | 8/1999 | Hines et al. | .................. | 42/115 |
| 5,974,940 A * | 11/1999 | Madni et al. | .................. | 42/119 |
| 6,061,945 A * | 5/2000 | Wallace et al. | ................ | 42/101 |
| 6,154,313 A * | 11/2000 | Isbell et al. | .................... | 33/298 |
| 6,295,170 B1 * | 9/2001 | Wallace et al. | ............. | 359/813 |
| 6,301,815 B1 * | 10/2001 | Sliwa | ........................ | 42/70.01 |
| 6,327,806 B1 * | 12/2001 | Paige | ......................... | 42/113 |
| 6,373,628 B1 * | 4/2002 | Gunnarsson et al. | .......... | 42/113 |
| 6,516,551 B2 * | 2/2003 | Gaber | ......................... | 42/132 |
| 6,519,889 B1 * | 2/2003 | Schlierbach et al. | .......... | 42/113 |
| 7,325,354 B2 * | 2/2008 | Grauslys et al. | ............... | 42/131 |
| 2005/0200965 A1 * | 9/2005 | Staley et al. | ................ | 359/634 |
| 2008/0192245 A1 * | 8/2008 | Stenton | ..................... | 356/251 |
| 2009/0223107 A1 * | 9/2009 | Lin et al. | ...................... | 42/115 |

FOREIGN PATENT DOCUMENTS

GB 2292465 2/1998

* cited by examiner

*Primary Examiner*—Yaritza Guadalupe-McCall
(74) *Attorney, Agent, or Firm*—Capitol City TechLaw

(57) ABSTRACT

An optical sight comprises an elongate housing defining a light channel. A lens is provided at one end of the light channel and has a partially reflecting surface. A laser diode is energised by a pulsating electric current delivered by a battery powered energising circuit, and the energised laser diode emits light towards the reflecting surface to produce a light spot by direct imaging of the laser diode on the surface. The light spot shall be superimposed on the target when sighting through the light channel from the other end thereof.

7 Claims, 2 Drawing Sheets

OPTICAL SIGHT

BACKGROUND OF THE INVENTION

1. Field of the Invention

The invention relates to an optical sight used for example on a hunting weapon such as a hunting gun. The invention more particularly relates to a sight in which a light source creates a light spot which is superimposed on a target which is viewed through the sight.

2. Description of Related Art

Weapon sights comprising a light channel, a lens at one end of the light channel, having a partially reflecting surface, a light emitting diode (LED), and a battery for energising the light source have been available for approximately 20 years. In these sights, the energised LED emits light towards the reflecting surface of the lens to produce an image of a light spot which can be superimposed on a target when sighting through the light channel from the other end thereof. The intensity of the light spot is varied by altering the drive current of the LED.

The main problem with these sights is low battery life (approximately four hours of continuous use at the brightest spot intensity). As a result, the user must replace the battery at regular intervals. This can lead to various practical problems especially if the user is in some remote location and batteries are not readily available. Further, since the sight can be used in extreme conditions, the battery compartment must be made as a watertight enclosure which can be opened. This adds to production costs and generally reduces the overall robustness of the sight.

SE-B-378 450 and SE-B-449 262 teach that in order to save energy, the LED should be pulsed. Although such an arrangement increases the battery life of the sight, the resulting sight still has a low battery life of approximately forty hours of continuous use at the brightest spot intensity.

BRIEF SUMMARY OF THE INVENTION

The optical sight of the invention comprises an elongate housing defining a light channel, a lens located at one end of the light channel and having a partially reflecting surface, a light source for emitting light towards the reflecting surface to produce an image of a light spot which is superimposed on a target when sighting through the light channel from the other end thereof, a battery for providing electric current, and an energising circuit for energising the light source operable to apply a pulsating electric current from the battery to said light source, for causing the light source to emit pulses of light.

According to the invention, in order to increase many times the battery life in an optical sight of this kind, a laser diode is provided as the light source therein. By using a laser diode the sight can be made substantially maintenance-free having a battery life of over 5000 hours of continuous use.

In the presently preferred embodiment of the sight according to the invention, control means are provided for energising the laser diode when the weapon is to be used and for automatically reducing energisation of the laser diode in dependence of a predetermined condition.

Reduced energisation of the laser diode also includes the condition wherein the laser diode is completely turned off.

In the presently preferred embodiment of the sight according to this invention, control means are incorporated to vary the intensity of the light spot.

The invention yields a significant increase of the overall efficiency of the sight because the laser diode has an electrical-to-(useful)optical efficiency, i.e. the efficiency in converting electric energy into useful optical energy which is used to produce the light seen by the user, which is considerably higher than the electrical-to-(useful)optical efficiency of a conventional LED as used in existing sights. Moreover, if the laser diode is energised only periodically, viz. during the periods when a weapon on which the sight is mounted, is in use or is ready for use, the battery will last for years, maybe for the lifetime of the sight, and therefore can be mounted in a permanently closed space in the sight so as to be exchanged only in the sight factory, e.g. in connection with maintenance service on the sight, no battery exchange being necessary in the field.

BRIEF DESCRIPTION OF THE DRAWINGS

In order to explain the invention in more detail an illustrative embodiment thereof will be described below reference being made to the accompanying drawings in which.

DETAILED DESCRIPTION OF THE INVENTION

Figure 1:
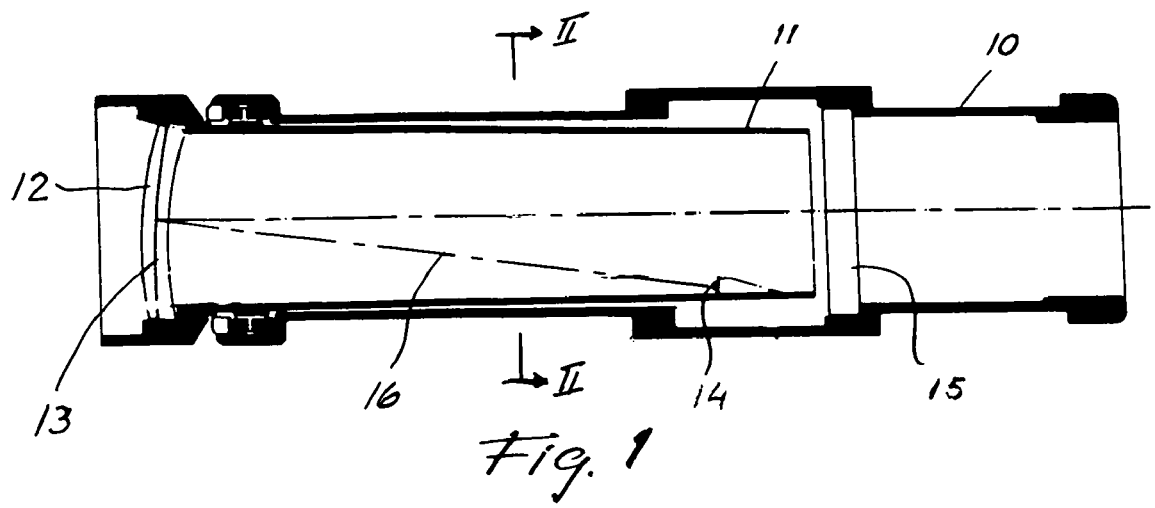
FIG. 1 is an axial sectional view of a sight of the invention.
Figure 2:
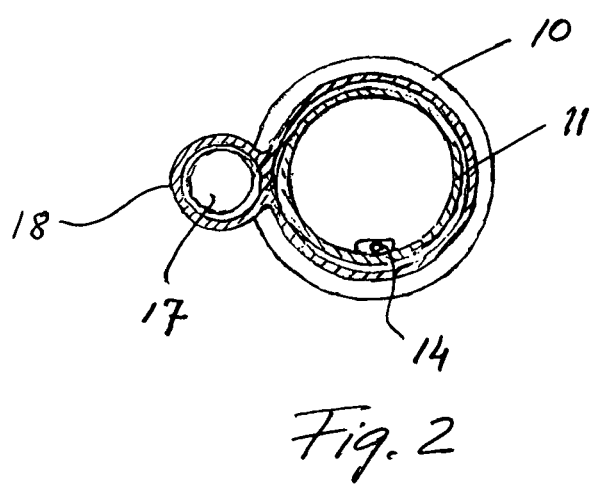
FIG. 2 is a cross sectional view along line II-II in FIG. 1.

The weapon sight disclosed in FIG. 1 comprises a light tunnel formed by an outer tube 10 to be fastened to the barrel of a weapon on which the sight shall be used, and an inner tube 11 which is mounted in the outer tube at one end and is fixed at the other end by adjustment means allowing adjustment of the longitudinal axis of the inner tube in relation to the longitudinal axis of the outer tube as is necessary in order to adapt the sight to the weapon on which it is used. In the one end of the inner tube a double lens 12 is provided having a layer 13 between the lenses, the reflecting red light. Inside the inner tube a light source 14 comprising a laser diode is mounted which projects a beam of red light on the layer 13 which reflects the light beam through a face-ground glass plate 15 having an anti-reflexion layer on the side thereof facing the right end of the light tunnel. The light path is indicated by a dot-and-dash line 16 in FIG. 1. The laser diode is energised via electronic drive circuitry by a battery 17 mounted in a closed housing 18 integral with the outer tube 10 and located e.g. on the side thereof as shown in FIG. 2, the battery being electrically connected with the drive electronics for the laser diode by conductors (not shown). A suitable battery for use in the sight of the invention is a lithium cell DL1/3N having a capacity of 160 mAh.

A representative laser diode for use in the sight of the invention is Sony SLD1122VS generating an optical output power of 5 mW at a forward current of 50 mA and a forward voltage of 2.2 V. The input power is therefore 110 mW and the electrical-to-optical efficiency 4.5%. This laser diode converts electric energy to useful optical energy 4500 times better than the existing conventional LED. There are two main reasons for this. The first reason is that a laser diode fundamentally has a better efficiency than an LED wherein a proportion of the generated light is trapped inside the diode by total internal reflection, is reabsorbed and causes the LED to heat up. This does not happen in the laser diode. The second reason is that the conventional LED is used with a metal mask placed in front of the LED to reduce the size of the light source and consequently the size of the beam emitted therefrom. The mask causes a significant amount of the output power of the LED to be wasted. It is not necessary to mask the laser diode in this manner, since it is an inherently small source. For example, the Sony SLD1122VS has a source size of 1 μm by 3 μm.

The intensity of the light spot in existing sights is varied by altering the drive current of the LED. Varying the light spot intensity in the weapon sight of the present invention is not best done in this simple manner. The use of a laser diode introduces a complication due to the laser light-current characteristic. There is a threshold current below which the laser diode does not lase. Control of the output power of the laser diode by control of the drive current in the manner applied with an LED is difficult, particularly for low output power. This is because the threshold current varies from one laser diode to the other and is also temperature dependent. Therefore, a better solution is to drive the laser diode into the lasing region and to control the output power of the laser diode by means of pulse width modulation.

If it is assumed that an average optical power output of 1 μW is typical for an LED used in a sight to produce the brightest spot intensity, then it is necessary to drive the laser diode at a duty cycle of 1 μW/5 mW=$2 \times 10^{-4}$. The average current taken by the laser diode to produce the brightest spot intensity is then $2 \times 10^{-4} \times 50$ mA=10 μA.

Figure 3:
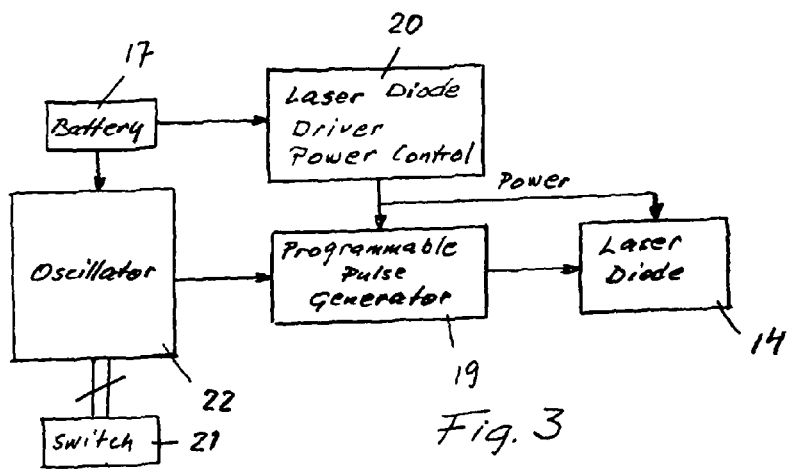
FIG. 3 is a block diagram of a complete electronics configuration for driving the laser diode and varying the intensity of the light spot via pulse width modulation.

FIG. 3 shows a block diagram of a circuit according to this technique. The laser diode 14 is driven with pulses from a programmable pulse generator 19 powered from the battery 17 via a laser diode driver power control 20. The brightness of the laser diode is varied by changing the pulse length in accordance with the present invention. The user sets the desired spot brightness using a multi-position switch 21 which controls an oscillator 22 connected to the pulse generator 19.

Figure 4:
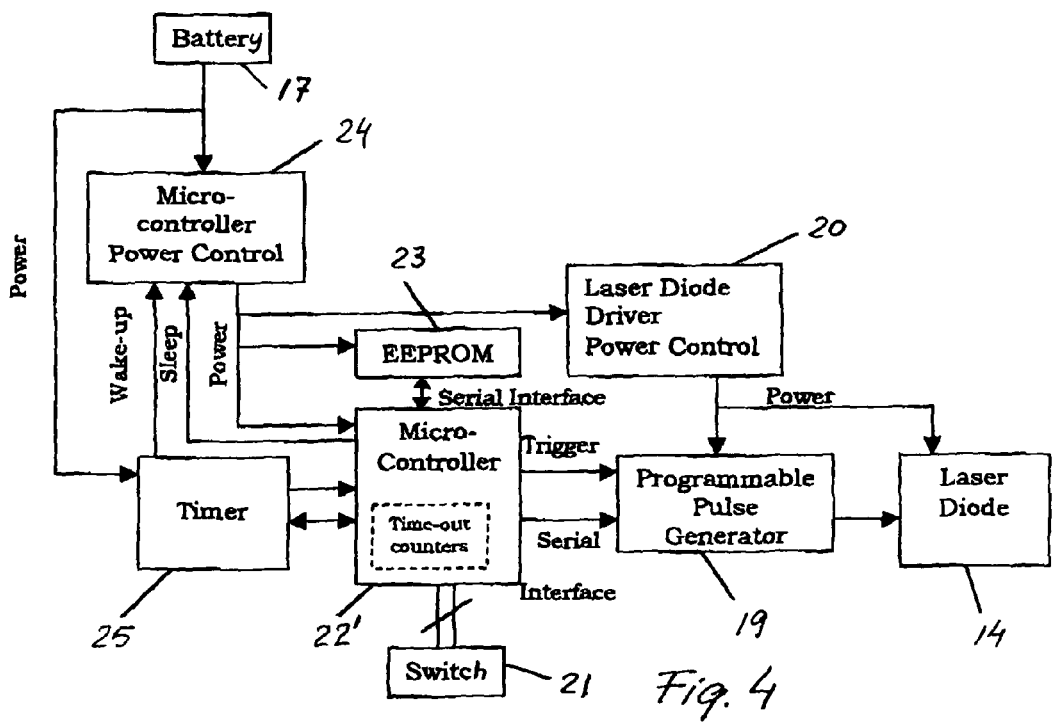
FIG. 4 is a similar block diagram as that in FIG. 3 including also means for reducing the energisation of the laser diode via the use of a predetermined time-out of the sight of the invention.

An alternative embodiment of the circuit is disclosed in FIG. 4, which incorporates an automatic time-out mechanism to reduce the energisation of the laser diode after a pre-determined length of time. This further increases the operational lifetime of the sight since there will be significant periods of time when there is little or no current consumption. The oscillator is replaced by a micro-controller 22' which reads the position of the switch 21 and sets the correct pulse length according to values in a look-up table stored in an EEPROM 23. When the unit is not in use, a micro-controller power control 24 powers the micro-controller 22' approximately once every second. If the switch position has not changed since the unit was last used, the micro-controller resets a timer 25 and the power controller 24 turns off the power. If the switch position has changed, then the unit has started to be used. In this situation the micro-controller 22' continuously triggers the programmable pulse generator 19 at a rate sufficient that the pulsing of the laser light is not evident to the user. The rate would typically be around 200 Hz. The timer 25 is reset by changes in the position of the switch 21 and is used to implement a time-out function. If a pre-determined period has elapsed before the position of switch 21 has changed, it is assumed that the sight is no longer in use and that it can be switched off by micro-controller 22'. The period of this time-out would typically be several hours. For a period before the end of the time-out period, the micro-controller 22' causes the laser diode to pulse at a low rate, visible to the user, so as to indicate to the user that the end of the time-out period is approaching. This warning period would typically be of the order of 10 seconds. If the user wishes to continue to use the sight, he moves the switch 21 by at least one position, causing the timer 25 to be reset via the micro-controller 22' and re-initiating the time-out period.

In a practical embodiment of the circuit described means should be provided to compensate for the change in laser diode characteristics with temperature. One possible way of achieving this would be to incorporate a thermistor into the circuit in series with the laser diode to provide a compensation in the current as the temperature changes. Furthermore, the circuit should be made fail safe such that any failure of the circuit leads to the laser diode being turned off. The eye of the person using the sight should not be exposed to an emission from the laser diode which is over the maximum permissible exposure limit.

The most simple solution for controlling the electronic circuit in order to have the laser diode deenergised during periods when a weapon on which the sight is mounted is not used and to energise the laser diode when the weapon is to be used and during use thereof is to include in the electronic circuit a time-out circuitry, as mentioned above. When the laser diode has been turned on, which can be effected for example by the user pressing a conveniently located push button switch, the time-out circuitry would simply automatically turn the laser diode off after a predetermined length of time—say several hours—after the laser diode has been turned on. Then, the user would just press the button again if he wishes continued use of the sight. The laser diode will then be energised for the predetermined time period. The time-out circuitry can include means for setting different lengths of the time-out. The end of the time-out period may be indicated to the user by causing the laser to flash at a rate visable to the human eye for a predetermined period before the end of the time-out period.

The electronic circuit can also include a detector which senses vibration and motion as long as a weapon on which the sight is mounted, is held by a user. When the laser diode has been turned on by the user actuating a switch in order to bring the weapon into use the laser diode will be turned off by a switch controlled by the detector when vibration or motion is no longer sensed by the detector due to the weapon no longer being held by the user. The detector can comprise e.g. a piezoelectric element. The vibration or motion signal can be integrated over the time and the laser diode can be turned off when the integrated signal falls below a predetermined threshold value.

Typically, weapons are stored in a different orientation to that in which they are shot. Either they may be stored vertically or lying on their side while they tend to be shot horizontally and upright. A tilt sensor can be provided to detect when the weapon is in a normal orientation for shooting and then the sensor can actuate a switch incorporated into the electronic circuit, in order to turn on the laser diode. When the weapon is put into a "non-shooting" position the laser diode will be turned off by the sensor actuated switch.

When a motion or vibration detector or a tilt sensor is provided for controlling energisation of the laser diode it may be desirable to have an override option which allows the laser diode to remain turned on also when no motion or vibration is detected or the weapon is in a "non-shooting" orientation. This override option can be protected by a time-out circuitry to prevent the laser diode from being left turned on unintentionally.

For daytime usage of a weapon on which the sight is mounted a photodiode for detecting ambient light could be included into the electronic circuit. When the ambient light is above a certain threshold level the laser diode should be turned on under the control of the photodiode, and when the ambient light is below this threshold value the current to the laser diode is reduced to a minimum setting under the control of the photodiode. This will allow operation of the sight at night and will also reduce the power consumption to its minimum level when the weapon is stored in the dark. If the weapon is to be stored in a light area the laser diode should not of course be turned on by the photodiode under the influence of ambient light. In this case the laser diode should be turned on by means of a manually operated switch possibly combined with a time-out function.

The laser diode requires to be turned on only when a user of a weapon on which the sight is mounted actually is looking through the sight. Therefore, a good method of determining when the sight is being used is to detect the presence of the eye. A low level IR source can be mounted inside the sight in the inner tube 11 thereof and facing towards the location of the eye. When the eye is present there would be reflection of the IR from the cornea and retina which can be detected to confirm the presence of a user. The red dot generated by the laser diode could itself be used as the illumination source which reflects off the eye. This solution requires less power since the sight would then contain only one light source. By pulsing the light source the reflected light could be distinguished from the ambient light.

The periodic blinking of the eye could be used as confirmation that the sight is being used. Combining detection of the eye reflection and the interruptions caused by blinking would enable reflection from inanimate items or other body parts to be distinguished.

The heat radiated from the user's face or the vibration introduced by the user's breathing also could be used for turning the laser diode on and off. For sensing the heat a temperature sensitive resistor can be mounted at the entrance of the sight. A motion or vibration sensor, such as a piezoelectric element or an accelerometer can be used as sensing element for the user's breathing.

Figure 5:
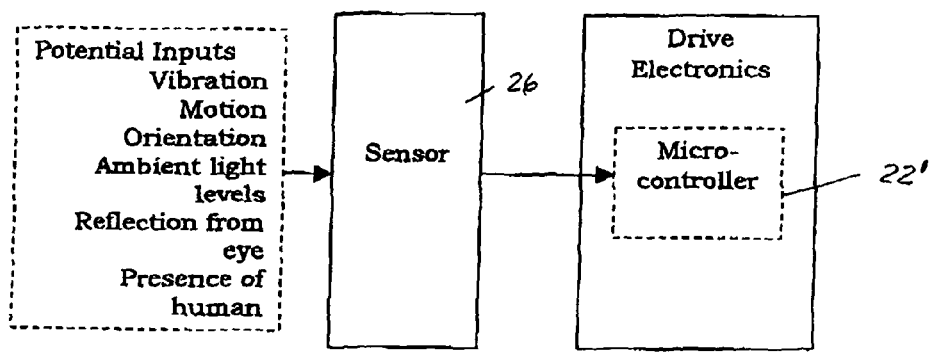
FIG. 5 is a block diagram showing the interaction of a deenergisation sensor, which determines when the gun to which the sight is attached is in use, with the drive electronics for the laser diode.

FIG. 5 summarizes in a block diagram the different methods of controlling energisation of the sight. A sensor 26 sensing the existence or non-existence of a predetermined condition controls the micro-controller 22' in the electronics (FIG. 4) for the laser diode 14 so as to energise the sight when the weapon is to be used and keep it energised during use, and/or to deenergise the sight when the weapon is no longer in use.

The invention claimed is:

1. An optical sight comprising:
   a tube having a distal end and a proximal end and defining a light channel;
   a lens located at said distal end of said tube and having a partially reflecting surface;
   a light source including a laser diode located in said tube for emitting light towards said partially reflecting surface to produce a light spot by direct imaging of said laser diode on said partially reflecting surface, said light spot forming an aim point which can be seen in said light channel from said proximal end of said tube to be superimposed on a target observed through said lens when sighting through said light channel from said proximal end of said tube;
   a battery for providing electric current;
   an energizing circuit for energizing said laser diode, operable to apply a pulsating electric current from said battery to said laser diode for causing said laser diode to emit pulses of light; and
   control means operatively connected with said energizing circuit for adjusting an intensity of said light spot by pulse width modulation of said laser diode.

2. An optical sight, as in claim 1, wherein said optical sight further includes control means for energizing said laser diode when a weapon is to be used and for automatically reducing energization of said laser diode in dependence of a predetermined condition.

3. An optical sight, as in claim 2, wherein said control means is a switch for energizing said laser diode.

4. An optical sight, as in claim 3, wherein said switch is a manually operated switch.

5. An optical sight as in claim 4, wherein said control means includes a time-out circuit for deenergizing said laser diode a predetermined period after said laser diode has been energized.

6. An optical sight, as in claim 3, wherein said control means includes a time-out circuit for deenergizing said laser diode a predetermined period after said laser diode has been energized.

7. An optical sight, as in claim 2 wherein said control means includes a time-out circuit for deenergizing said laser diode a predetermined period after said laser diode has been energized.

\* \* \* \* \*